United States Patent
Achanta et al.

(10) Patent No.: US 12,504,725 B2
(45) Date of Patent: Dec. 23, 2025

(54) SELF-HEALING ADAPTIVE CONTROLLER FOR INDUSTRIAL ASSET ABNORMALITY ACCOMMODATION

(71) Applicant: General Electric Company, Schenectady, NY (US)

(72) Inventors: Hema K. Achanta, Niskayuna, NY (US); Masoud Abbaszadeh, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 428 days.

(21) Appl. No.: 18/353,486

(22) Filed: Jul. 17, 2023

(65) Prior Publication Data

US 2025/0028288 A1 Jan. 23, 2025

(51) Int. Cl.
*G05B 13/02* (2006.01)
*G05B 23/02* (2006.01)

(52) U.S. Cl.
CPC .............................. *G05B 13/0265* (2013.01)

(58) Field of Classification Search
CPC ........ G05B 13/00; G05B 13/02; G05B 19/00; G05B 23/02; G06N 20/00; G06N 3/08; G08C 17/00
See application file for complete search history.

(56) References Cited

U.S. PATENT DOCUMENTS 6,510,353 B1 * 1/2003 Gudaz ................ G05B 19/0428
700/71

6,985,779 B2 * 1/2006 Hsiung ................ G05B 19/042
700/20

(Continued)

OTHER PUBLICATIONS

Van Heusden, Klaske et al., "Non-iterative data-driven controller tuning with guaranteed stability: Application to direct-drive pick-and-place robot", 2010 IEEE International Conference on Control Applications Part of 2010 IEEE Multi-Conference on Systems and Control Yokohama, Japan, Sep. 8-10, 2010, Download on Nov. 13, 2023, (pp. 1005-1010, 6 total pages).

(Continued)

*Primary Examiner* — Ronald D Hartman, Jr.
(74) *Attorney, Agent, or Firm* — Buckley, Maschoff & Talwalkar LLC

(57) ABSTRACT

A training data store may contain training data associated with monitoring node values during normal operation of an industrial asset and simulated abnormal data. An offline model tuning platform accesses the training data from normal operation of the industrial asset and the simulated abnormal data in the training data store. Based on the training data from normal operation of the industrial asset, the simulated abnormal data, an abnormal operating condition, and a constrained optimization solution, controller tuning parameters are created for at least one tuned data-driven adaptive controller such that an operating condition of the industrial asset will move from the abnormal operating condition to a normal operation condition through a stable trajectory. An online monitoring platform receives a stream of current monitoring node values and, when the abnormal operating condition is detected, utilizes the controller tuning parameters to implement the at least one tuned data-driven adaptive controller.

20 Claims, 17 Drawing Sheets

(56) References Cited

U.S. PATENT DOCUMENTS

| | | | | |
|---|---|---|---|---|
| 7,856,281 | B2* | 12/2010 | Thiele | G05B 13/048 |
| | | | | 700/32 |
| 9,568,910 | B2* | 2/2017 | Drees | G05B 23/00 |
| 9,753,455 | B2* | 9/2017 | Drees | G06Q 10/06 |
| 10,678,244 | B2* | 6/2020 | Iandola | G06F 30/20 |
| 10,879,831 | B1* | 12/2020 | Nagel | G05B 13/0265 |
| 11,550,682 | B2* | 1/2023 | Sobolev | G06N 3/088 |
| 2019/0236447 | A1* | 8/2019 | Cohen | G06N 3/092 |
| 2020/0285997 | A1* | 9/2020 | Bhattacharyya | G06N 7/01 |

OTHER PUBLICATIONS

Van Heusden, Klaske et al., "Data-driven controller tuning with integrated stability constraint", 2008 Proceedings of the 47th IEEE Conference on Decision and Control Cancun, Mexico, Dec. 9-11, 2008, (pp. 2612-2617, 6 total pages).

Gauthier, Jon, "Conditional generative adversarial nets for convolutional face generation", Semantic Scholar (2015), (pp. 1-9, 9 total pages).

* cited by examiner

SELF-HEALING ADAPTIVE CONTROLLER FOR INDUSTRIAL ASSET ABNORMALITY ACCOMMODATION

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect and accommodate/neutralize, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable. This might be the case, for example, when only one monitoring node is used in a detection algorithm. Note that the phrase "monitoring node" might refer to, for example, a sensor node, an actuator node, or any other type of node. Existing approaches to protect an industrial control system, such as failure and diagnostics technologies, may not adequately address these problems-especially when multiple, simultaneous attacks occur since such multiple faults/failure diagnostic technologies are not designed for detecting stealthy attacks in an automatic manner.

It may be important to maintain an industrial asset's functionality during an attack. For example, an operator may want a power generation plant to continue to provide electricity even when one or more sensors, actuators, etc. are the subject of a cyber-attack. It may similarly be desired to operate the asset when one or more monitoring nodes fail. Moreover, it may be advantageous to provide protection for an industrial asset without requiring redundant components (e.g., industrial control systems) and/or any major changes and/or re-design of controllers. In some cases, a virtual sensing system may get a portion of sensor measurements that are healthy and uncompromised and use that information to provide healthy estimations for the measurements of the sensors that are compromised. Since the compromised and uncompromised portions of the measurements might be any subset of the system sensors, this approach may present a combinatorial problem that requires that a substantial number of estimation models be developed and stored. As a result, this technique can require a relatively long development time frame using brute force methods.

Note that attacks and/or faults may be experienced at a controller node which can have different implications as compared to a sensor node. It may therefore be desirable to react to an attack and/or fault that occurs at a controller node (e.g., including an actuator node) in a relatively quick and effective way to maintain operation of an industrial asset. It would therefore be desirable to automatically provide self-healing adaptive control in an automatic, accurate, and stable manner.

SUMMARY

According to some embodiments, a training data store may contain training data associated with monitoring node values during normal operation of an industrial asset and simulated abnormal data. An offline model tuning platform accesses the training data from normal operation of the industrial asset and the simulated abnormal data in the training data store. Based on the training data from normal operation of the industrial asset, the simulated abnormal data, an abnormal operating condition, and a constrained optimization solution, controller tuning parameters are created for at least one tuned data-driven adaptive controller such that an operating condition of the industrial asset will move from the abnormal operating condition to a normal operation condition through a stable trajectory. An online monitoring platform receives a stream of current monitoring node values and, when the abnormal operating condition is detected, utilizes the controller tuning parameters to implement the at least one tuned data-driven adaptive controller.

Some embodiments comprise: means for accessing, by a computer processor of an offline model tuning platform, training data from normal operation of the industrial asset and simulated abnormal data from a training data store; based on the training data from normal operation of the industrial asset, the simulated abnormal data, an abnormal operating condition, and a constrained optimization solution, means for creating controller tuning parameters for at least one tuned data-driven adaptive controller such that an operating condition of the industrial asset will move from the abnormal operating condition to a normal operation condition through a stable trajectory; and means for receiving, by an online monitoring platform, a stream of current monitoring node values and, when the abnormal operating condition is detected, utilizing the controller tuning parameters from a controller reference library to implement the at least one tuned data-driven adaptive controller.

Some technical advantages of some embodiments disclosed herein are improved systems and methods to provide self-healing adaptive control for an industrial asset in an automatic, accurate, and stable manner.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Figure 1:
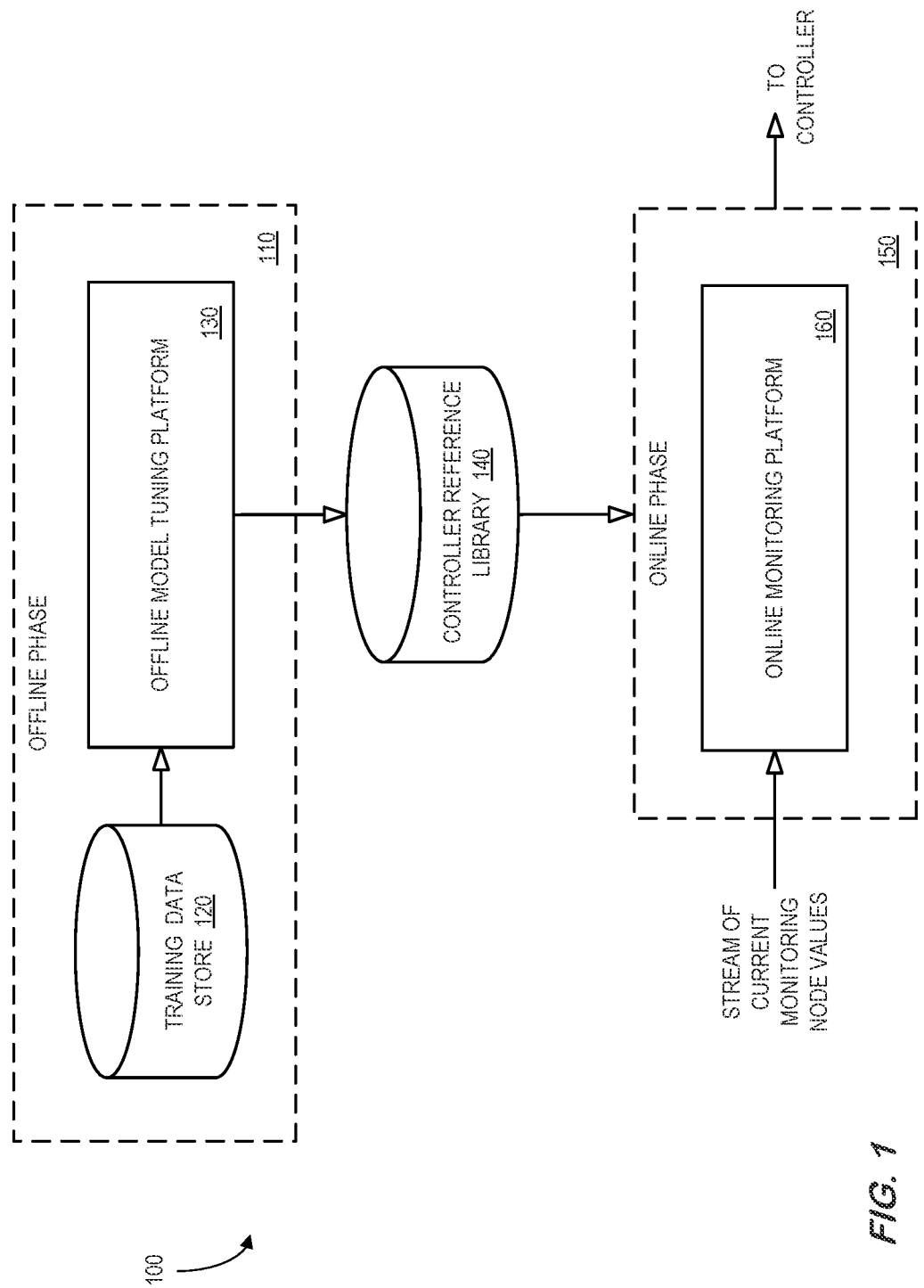
FIG. 1 is a high-level architecture for a system to provide self-healing adaptive control according to some embodiments.

FIG. 1 is a high-level block diagram of a system 100 to provide self-healing adaptive control according to some embodiments. The system 100 may include both an offline phase 110 and an online phase 150. The offline phase 110 may have a training data store 120 that contains training data during normal operation of an industrial asset, such as from monitoring nodes of a power grid. The training data store 120 may also, according to some embodiments, include simulated adversarial data (e.g., associated with a cyber-attack, fault, or other abnormality).

Information from the training data store 120 may be provided to an offline model tuning platform 130. The offline model tuning platform 130 may, based on the training data from normal operation of the industrial asset, the simulated abnormal data (if available), an abnormal operating condition, and a constrained optimization solution, automatically create controller tuning parameters for at least one tuned data-driven adaptive controller. The data-driven adaptive controller may be tuned, for example, such that an operating condition of the industrial asset will move from the abnormal operating condition to a normal operation condition through a stable trajectory. As used herein, the term "automatically" may refer to, for example, actions that can be performed with little or no human intervention. The tuning parameters may then be stored into a controller reference library 140.

An online monitoring platform 160 in the online phase 150 may receive tuning parameters from the controller reference library along with a stream of current monitoring node values of the industrial asset. When the abnormal operating condition is detected, the online monitoring platform may utilize the controller tuning parameters to implement the at least one tuned data-driven adaptive controller.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The system 100 may store information into and/or retrieve information from various data stores, such as the training data store 120. The various data stores may be locally stored or reside remote from other components. Although a single offline model tuning platform 130 is shown in FIG. 1, any number of such devices may be included. Moreover, various devices described herein might be combined according to embodiments of the present invention. For example, in some embodiments, the offline model tuning platform 130 and the training data store 120 might comprise a single apparatus. The functions of the system 100 may be performed by a constellation of networked apparatuses, in a distributed processing or cloud-based architecture.

A user may access the system 100 via one of the monitoring devices (e.g., a Personal Computer ("PC"), tablet, or smartphone) to view information about and/or manage adaptive controller and system information in accordance with any of the embodiments described herein. In some cases, an interactive graphical display interface may let a user define and/or adjust certain parameters (e.g., information mappings, trigger levels, model configurations, etc.) and/or provide or receive automatically generated recommendations, alerts, or results from the system 100.

Figure 2:
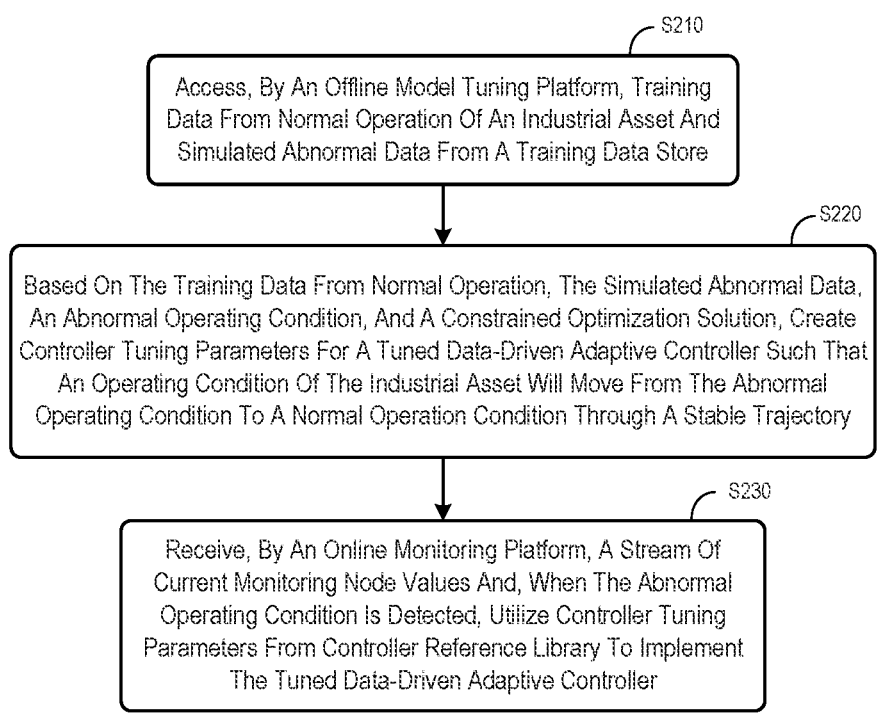
FIG. 2 is a method to provide self-healing adaptive control in accordance with some embodiments.

FIG. 2 is a method that might be associated with the system 100 of FIG. 1 in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of an offline model tuning platform may access training data from normal operation of an industrial asset and (if available) simulated abnormal data from a training data store. As used herein, the phrase "industrial asset" might be associated with, for example, a turbine, a gas turbine, a wind turbine, an engine, a jet engine, a locomotive engine, a refinery, a power grid, an autonomous vehicle, etc. According to some embodiments, the simulated abnormal data is associated with a physics-based model and/or a data-driven model. Moreover, simulated abnormal data may be associated with a Generative Adversarial Network ("GAN"). The training data might originate from monitoring nodes, such as a sensor node, a critical sensor node, an actuator node, a controller node, a key software node, etc.

Based on the training data from normal operation of the industrial asset, the simulated abnormal data, an abnormal operating condition (e.g., a cyber-attack or a fault), and a constrained optimization solution, at S220 the system may automatically create controller tuning parameters for a tuned data-driven adaptive controller such that an operating condition of the industrial asset will move from the abnormal operating condition to a normal operation condition through a stable trajectory. According to some embodiments, the tuned data-driven adaptive controller is a closed loop system that resembles a desired stable reference model. Moreover, the phrase "operating condition" may be associated with a normal space and an abnormal space that are separated by a decision boundary.

At S230, an online monitoring platform may receive a stream of current monitoring node values and, when the abnormal operating condition is detected, utilize the controller tuning parameters from a controller reference library to implement the tuned data-driven adaptive controller. In some embodiments, the online monitoring platform may also decide between a resilient estimation accommodation and the tuned data-driven adaptive controller accommodation. The received stream of current monitoring node values might be associated with, for example, a Supervisory Control And Data Acquisition ("SCADA") data stream.

Figure 3:
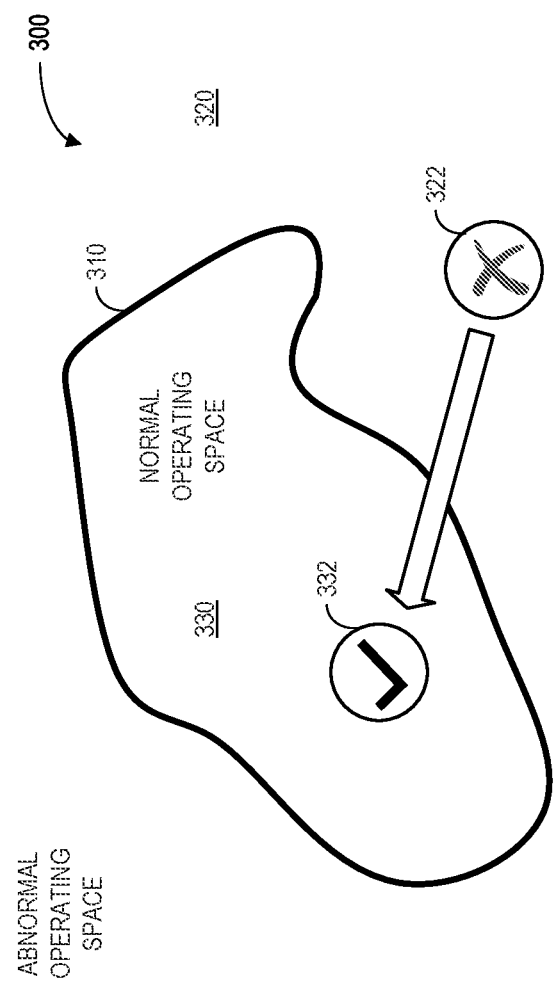
FIG. 3 illustrates operating condition spaces for a controller according to some embodiments.
Figure 4:
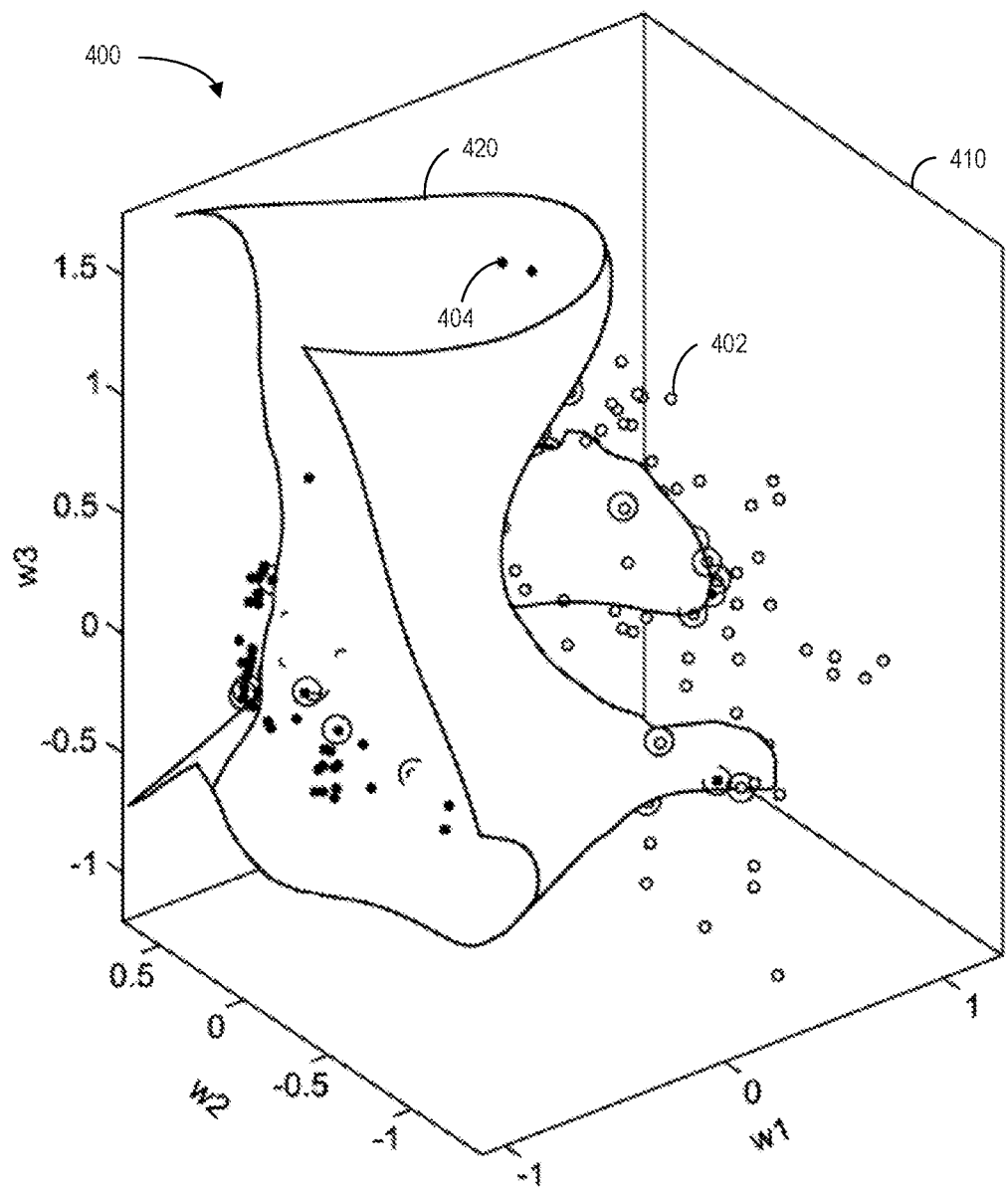
FIG. 4 illustrates a classification decision boundary using a two-class or multi-class support vector machine with a radial basis function kernel.

In this way, embodiments may provide a method for automated self-healing of an attacked system by moving the system from the current abnormal operating condition to an achievable normal operating condition. Embodiments may tune and design a controller such that under an attack the closed loop system resembles a desired stable reference model. As a result, the system moves from the abnormal operating condition to normal operating condition through a stable trajectory. That is, a self-healing controller may move the asset from a current abnormal operating condition to an achievable normal operating condition. FIG. 3 illustrates operating condition spaces 300 for a controller according to some embodiments. The spaces 300 include a decision boundary 310 that separates an abnormal operating space 320 from a normal operating space 330. Embodiments may use a self-healing adaptive controller to move the system from a current abnormal operating condition 322 ("X") to an achievable normal operating condition 332 (checkmark) as shown by the arrow in FIG. 3. Although a simple two-dimensional decision boundary 310 is illustrated in FIG. 3 for clarity, note that more complex boundaries may be implemented. For example, FIG. 4 illustrates 400 a three-dimensional graph 410 of a classification decision boundary 420 separating abnormal operation points 402 from normal operation points 404 generated using a two-class or multi-class support vector machine with a radial basis function kernel.

Embodiments may use a data-driven model reference approach for the controller design. For example, embodiments may tune and design a controller such that the closed loop system closely resembles a desired reference model. Two challenges that the self-healing controller may need to address include:
understanding the reachability of the desired state of the system in comparison to the current operating condition, and the stability of the closed loop system.

To address these needs, one may need to understand the landscape of the abnormal operating space 320. Note that the attack generation might be done using a physics-based or data-driven model. If such a model is available, different attack scenarios may be simulated using simulation platforms. If such a model is not available, embodiments may take a completely model-free approach for attack generation. Towards this end, some embodiments may leverage a conditional GAN to generate different types of attack conditions. In a conditional GAN, a generative model can be in different modes when provided with different contextual information. Embodiments may condition the generator to generate data for different attack conditions, such as bias attacks, multiplicative attacks, sinusoidal attacks, Pseudo-Random Binary Sequence ("PRBS") attacks, etc.

Figure 5:
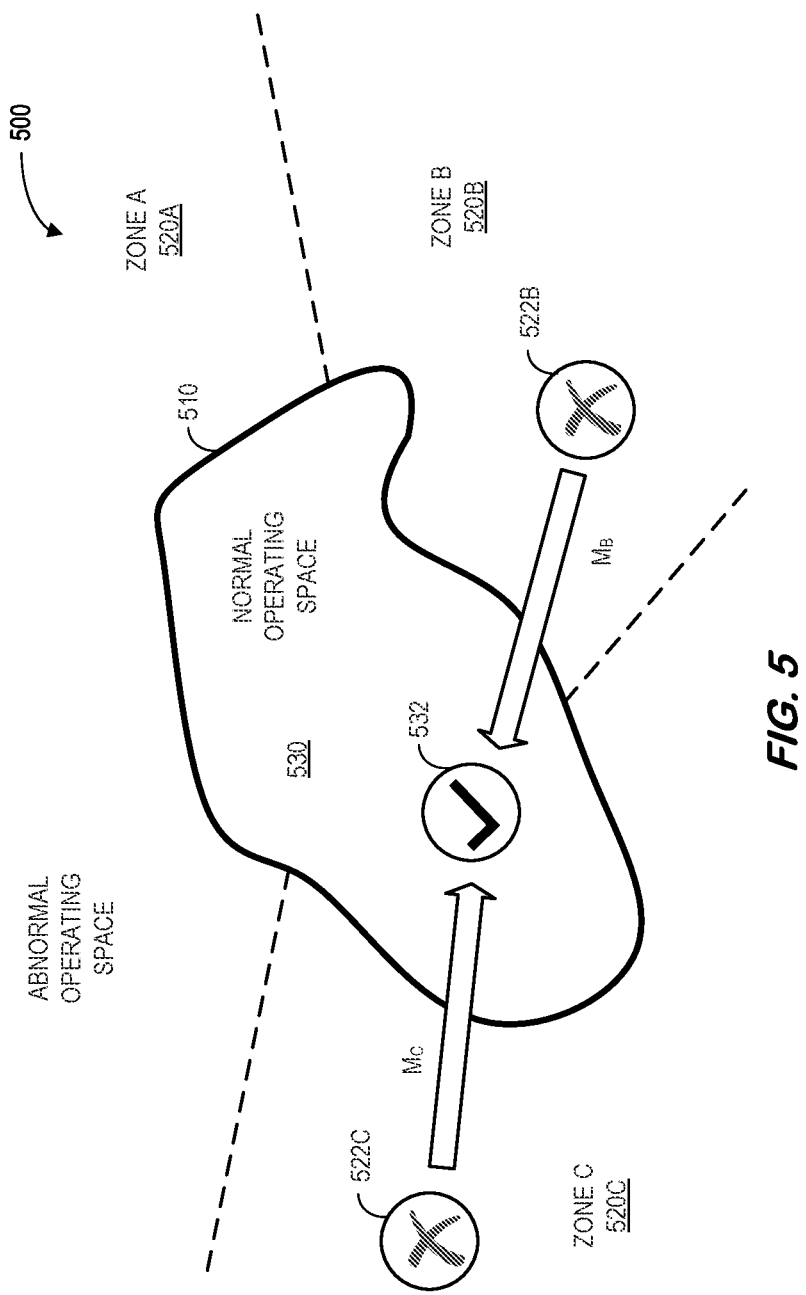
FIG. 5 shows operating condition spaces with multiple abnormal operating zones in accordance with some embodiments.

Referring again to FIG. 3, to make the problem tractable embodiments may divide the abnormal operating space 320 and/or the normal operating space 330 into different zones. For example, the abnormal operating space 320 may be divided into a plurality of abnormal zones each associated with a different stable closed loop model reference. FIG. 5 shows operating condition spaces 500 in accordance with some embodiments. As before, the spaces 500 include a decision boundary 510 that separates an abnormal operating space from a normal operating space 530. Embodiments may use a self-healing adaptive controller to move the system from a current abnormal operating condition ("X") to an achievable normal operating condition 532 (checkmark). In this case, however, the abnormal operating space is divided into three zones: zone A 520A, zone B 520B, and zone C 520C (with each zone being associated with a different abnormal condition). Multiple models may then be used to bring an abnormal operating condition to the normal operating condition 532. In particular, model MB may move an abnormal operating condition 522B in zone B 520B to the normal operating condition 532 while model Mc moves an abnormal operating condition 522C in zone C 520C to the normal operating condition 532. For each of the zones in the abnormal space 520A, 520B, 520C, the system may build a corresponding stable closed loop model reference to which the controller may be tuned such that the system is driven from a current abnormal operating condition 522B, 522C to the reachable normal operating condition 532.

Figure 6:
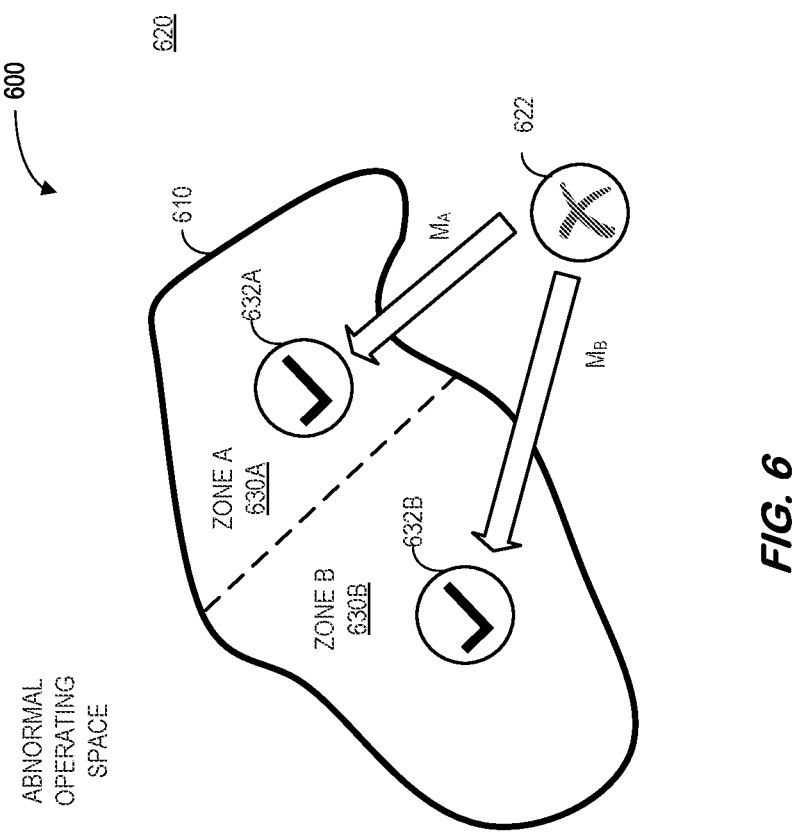
FIG. 6 shows operating condition spaces with multiple normal operating zones in accordance with some embodiments.

Similarly, FIG. 6 shows operating condition spaces 600 with multiple normal operating zones in accordance with some embodiments. In this embodiment, a normal space is divided into a plurality of normal zones (each associated with a different achievable normal operating condition). As before, the spaces 600 include a decision boundary 610 that separates an abnormal operating space 620 from a normal operating space. Embodiments may use a self-healing adaptive controller to move the system from a current abnormal operating condition 622 ("X") to an achievable normal operating condition (checkmark). In this case, however, the normal operating space is divided into two zones: zone A 630A and zone B 630B (with each zone being associated with a different normal condition). Multiple models may then be used to bring the abnormal operating condition 622 to a normal operating condition. In particular, model $M_A$ may move an abnormal operating condition 622 to a normal operating condition 632A in zone A 630A while model $M_B$ moves the abnormal operating condition 622 to a normal operating condition 632B in zone B 630B. For each of the zones in the normal space 630A, 630B, the system may build a corresponding stable closed loop model reference to which the controller may be tuned such that the system is driven from the current abnormal operating condition 622 to a reachable normal operating condition 632A, 632B.

Figure 7:
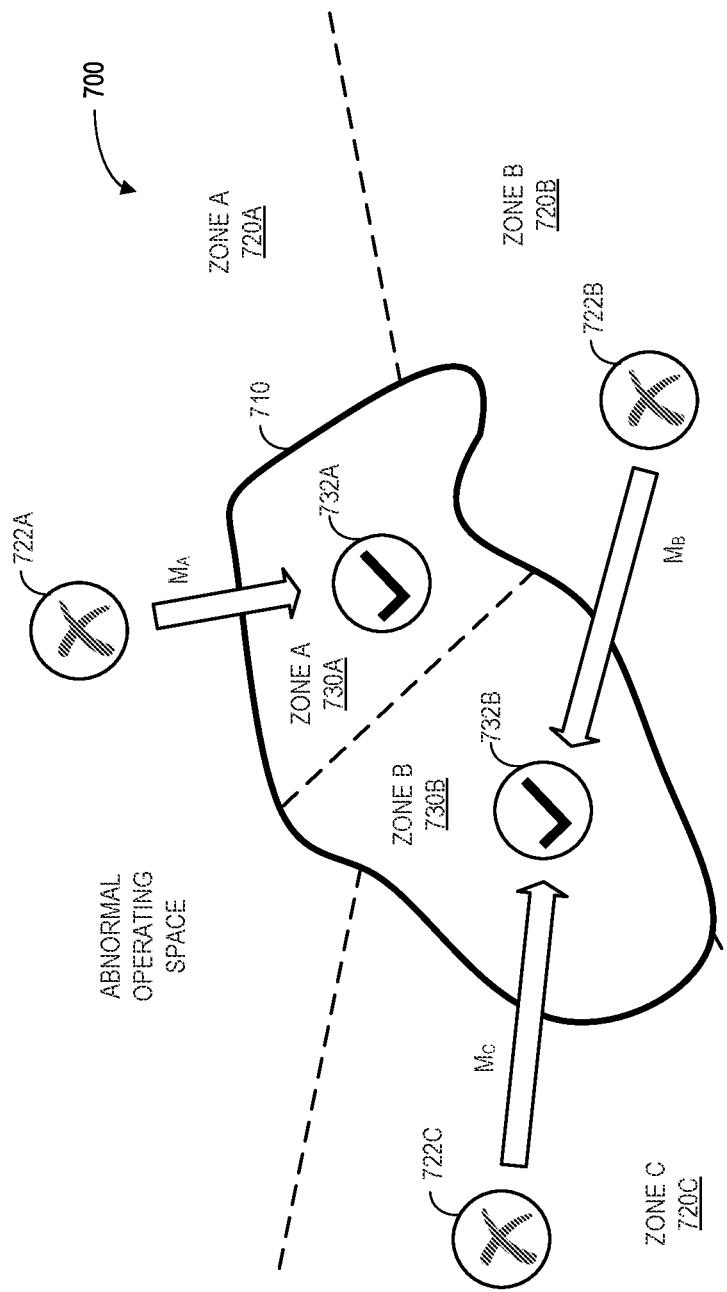
FIG. 7 shows operating condition spaces with multiple abnormal and normal operating zones according to some embodiments.

Note that multiple zones might be implemented in both abnormal and normal operating spaces. For example, FIG. 7 shows operating condition spaces 700 with multiple abnormal and normal operating zones according to some embodiments. A decision boundary 710 separates an abnormal operating space (comprised of zone A 720A, zone B 720B, and zone C 720C) and a normal operating space (comprised of Zone A 730A and zone B 730B). Various reference models may then move the system from attack points (e.g., 722A, 722B, 722C) to corresponding safe points (e.g., 732A, 732B).

According to some embodiments, the design of the controller is achieved by solving a constrained optimization problem. The constrained optimization solution may be, for example, be represented by an optimization problem given by:

$$\rho_s = \mathrm{argmin}_\rho J(\rho), \text{ s.t. } \delta(\rho) \le \delta_N$$
$$J(\rho) = |(1-M)(M - K(\rho)(1-M)G|_2$$
$$\delta(\rho) = |M_S - K(\rho)(1-M_S)G|_2$$

where G represents an open loop plant, M represents a model reference, K represents stabilizing for a controller of the plant G. $K(\rho)$ is the controller with control parameter $\rho$, and $M_S$ is the closed loop plant stabilized by controller $K_S$. Such optimization problems are discussed, for example, in K. van Heusden, A. Karimi, D. Bonvin, A. den Hamer and M. Steinbuch, "Non-iterative data-driven controller tuning with guaranteed stability: Application to direct-drive pick-and-place robot," 2010 IEEE International Conference on Control Applications, Yokohama, 2010 (pp. 1005-1010) and K. van Heusden, A. Karimi and D. Bonvin, "Data-driven controller tuning with integrated stability constraint," 2008 47th IEEE Conference on Decision and Control, Cancun, 2008 (pp. 2612-2617). Other methods, such as genetic algorithms, could also be used to obtain optimal control parameters.

Figure 8:
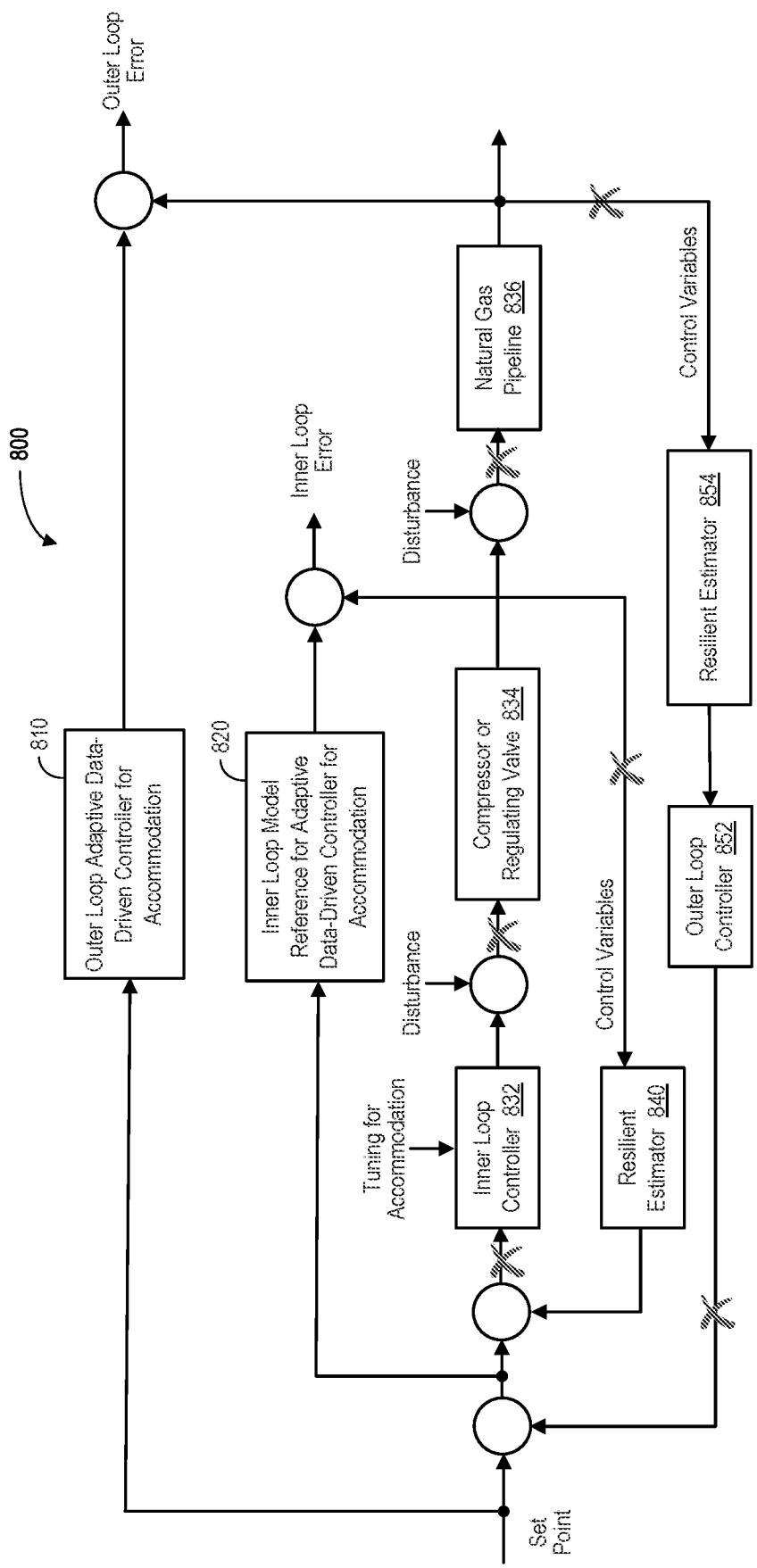
FIG. 8 is a high-level representation of data-driven adaptive controller tuning for attack accommodation in accordance with some embodiments.

FIG. 8 is a high-level representation 800 of data-driven adaptive controller tuning for attack accommodation in accordance with some embodiments. As shown in the representation 800, both the outer loop and inner loop controller reconfiguration may be considered in the attack accommodation approach according to some embodiments. A set point is provided to an outer loop adaptive data-driven controller for accommodation 810. Information from the outer loop controller 810 is combined with industrial asset data (e.g., data from a natural gas pipeline 836) to generate an outer loop error. The set point is also provided to an inner loop model reference for adaptive data-driven controller for accommodation 820. Information from the inner loop model reference 820 is combined with industrial asset data (e.g., data from a compressor or regulating valve 834) to generate an inner loop error. An inner loop controller 832, tuning for accommodation, and disturbance information are combined and provided to the compressor or regulating valve 834. Resilient estimators 840, 854 may receive control variables which, in some cases, may be provided to an outer loop controller 852. Note that in FIG. 8, potential attack points are illustrated with an "X." The overall objective of the adaptive controller tuning task may be to build a stable closed loop model reference library and to tune the controller to move the system from different attack conditions to the corresponding safe reachable normal condition such that the outer and inner loop errors are minimized.

Figure 9:
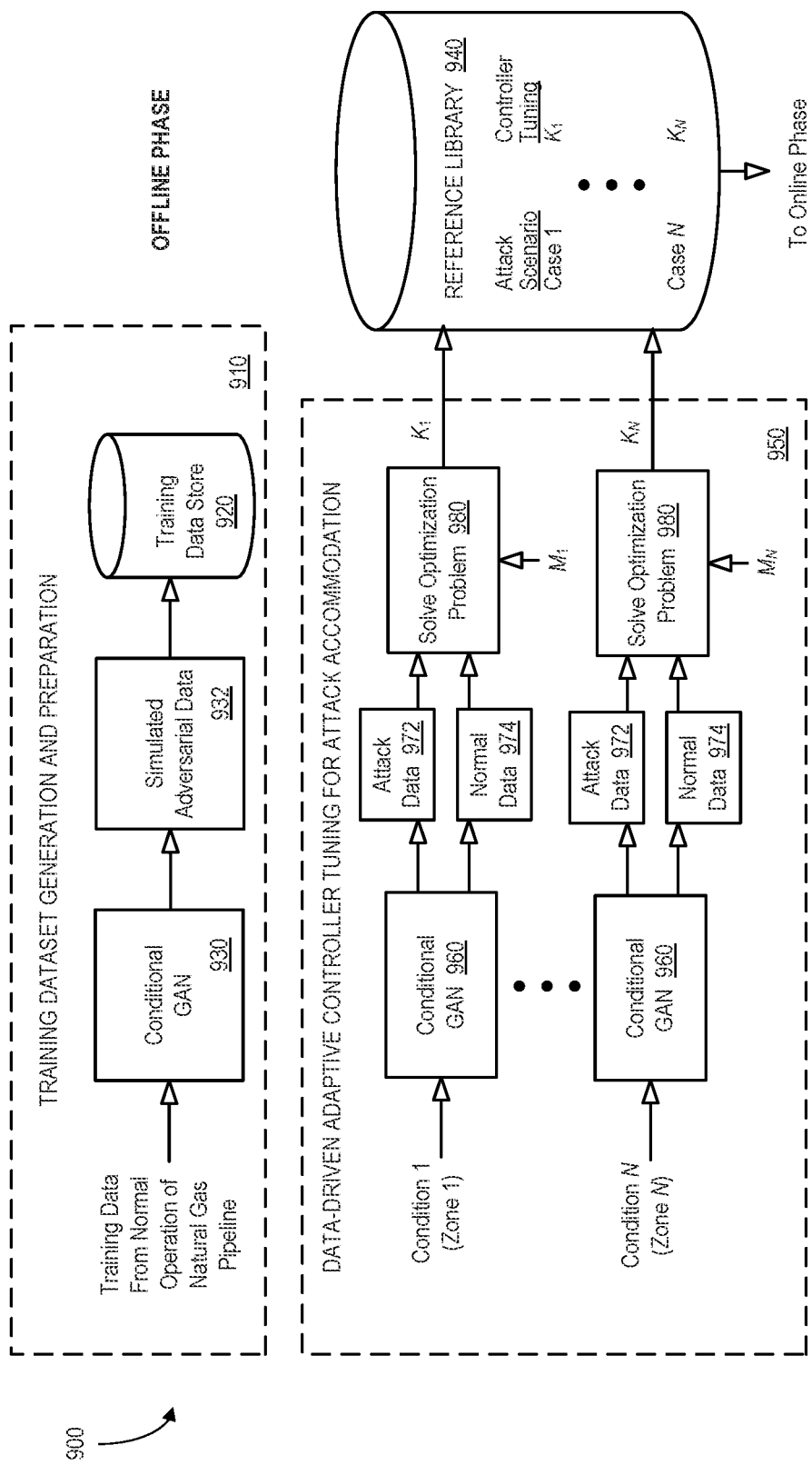
FIG. 9 illustrates an offline phase of a data-driven adaptive controller tuning method according to some embodiments.

Some embodiments described herein have an offline phase and an online phase. FIG. 9 illustrates an offline phase 900 of a data-driven adaptive controller tuning method according to some embodiments. In FIG. 9, $K_i$ represents the tuned controller for the i-th attack condition using $M_i$ as the model reference. The offline phase 900 includes a training dataset generation and preparation portion 910 including a conditional GAN 930 that receives training data from normal operation of an industrial asset (e.g., a natural gas pipeline system) and generates simulated adversarial data 932. A training data store 920 may contain training data from normal operation of an industrial asset (such as a power grid) and simulated adversarial data.

A data-driven adaptive controller tuning for attack accommodation portion 950 of the offline phase 900 may then be used to store tuning parameters into a reference library 940. For each of a plurality of abnormal conditions (e.g., conditions 1 through N associated with attack scenarios and abnormal operating space zones 1 through N), a conditional GAN 960 may output attack data 972 and normal data 974 to solve an optimization problem 980. Model information (e.g., models 1 through N) can then be used to generate tuning parameters for each abnormal condition (e.g., parameters $K_0$ through $K_N$) which are stored into the reference library 940.

Figure 10:
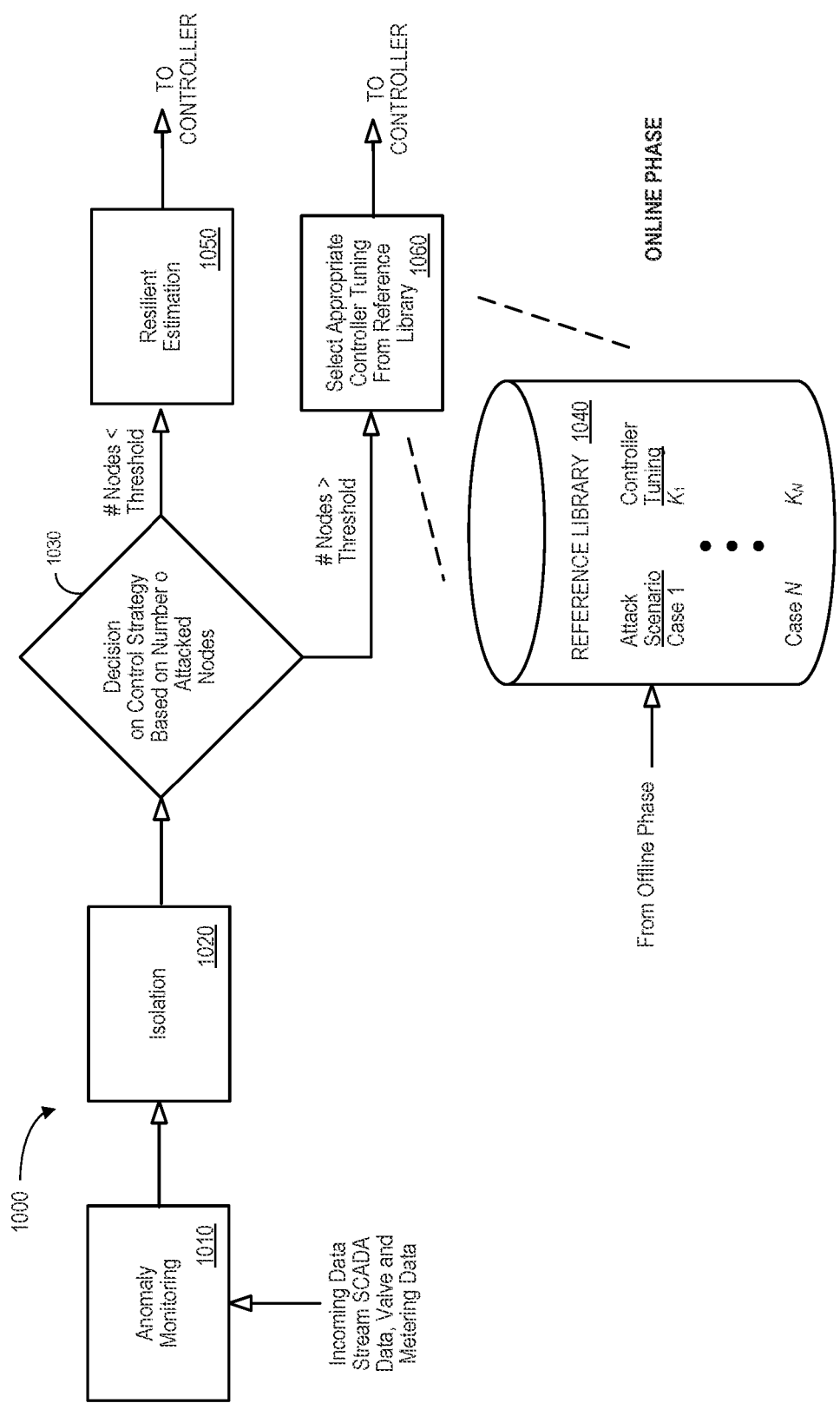
FIG. 10 illustrates an online phase of a data-driven adaptive controller tuning method in accordance with some embodiments.

FIG. 10 illustrates an online phase 1000 of a data-driven adaptive controller tuning method in accordance with some embodiments. During the online phase 1000, an incoming data stream (e.g., SCADA data, valve and metering data, etc.) is processed by an anomaly monitoring module 1010 to identify any anomalies in the operation of the natural gas pipeline system. If an anomaly is identified, an isolation module 1020 is activated which then identifies a set of nodes in the network (and a set of features corresponding to these nodes) that have been corrupted by the cyber-attack. Based on the number of nodes under attack, a control strategy decision making module 1030 decides whether to perform a constrained resilient estimation 1050 of the attacked features (e.g., when the number of attacked nodes is below a threshold value). Such an approach is described, for example, in US Patent Publication No. US-2021-0182385 entitled "DYNAMIC, RESILIENT VIRTUAL SENSING SYSTEM AND SHADOW CONTROLLER FOR CYBER-ATTACK NEUTRALIZATION," published Jun. 17, 2021. The control strategy decision making module 1030 may instead decide to close the loop with the resilient controller to drive the natural gas pipeline system to a safer mode of operation 1060 (e.g., when the number of attacked nodes is above a threshold value). If the resilient controller option 1060 is chosen, then the appropriate model reference and the tuned controller are chosen (based on the attack zone in which the current operating condition belongs) from the model reference library 1040 to drive the system to a safe operating condition. In this way, embodiments may provide a solution to the problem of automatic control reconfiguration and restore normal operation of the system in the presence of a cyber-attack.

Figure 11:
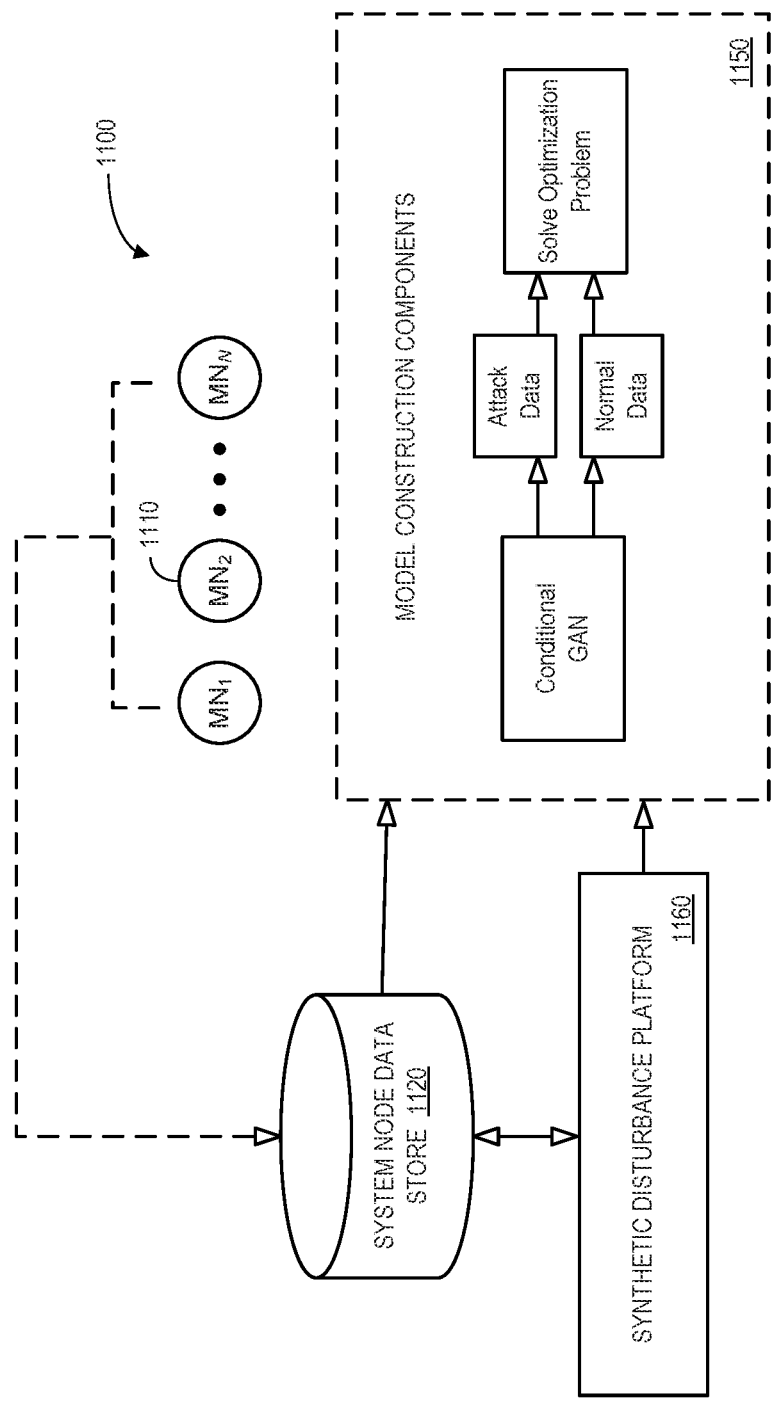
FIG. 11 is a high-level block diagram of a system for some use cases.

FIG. 11 is a high-level block diagram of a system 1100 associated with some use cases. The system 1100 may include a system node data store 1120 storing, for each of a plurality of monitoring nodes 1110, a series of normal values over time that represent normal operation of an industrial asset (e.g., collected from actual monitoring node 1110 data as illustrated by the dashed line in FIG. 11). Information from the system node data store 1120 and a synthetic disturbance platform 1160 may be provided to model construction components 1150. The model construction components 1150 include elements that automatically create controller tuning parameters for a self-healing data-driven adaptive controller. The model construction components 1150 select tuning parameters such that an operating condition of an industrial asset moves from an abnormal operation condition to a normal operating condition through a stable trajectory.

Figure 12:
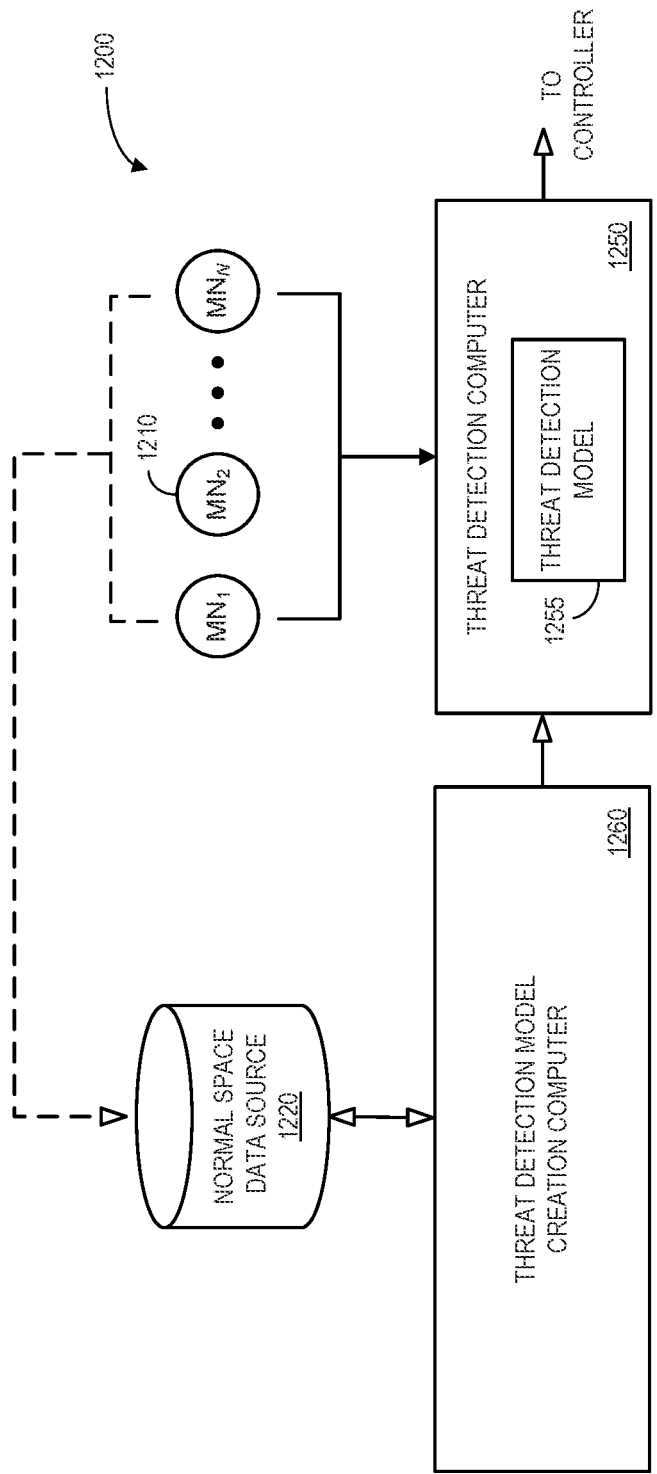
FIG. 12 is a high-level block diagram of a system to protect an industrial asset for some use cases.

FIG. 12 is a high-level architecture of a system 1200 that might be used to protect an asset in some use cases. The system 1200 may include a "normal space" data source 1220 storing, for each of a plurality of monitoring nodes 1210 $MN_1$ through $MN_N$, a series of normal values over time that represent normal operation of an industrial asset (e.g., collected from actual monitoring node 1210 data as illustrated by the dashed line in FIG. 12). Information from the normal space data source 1220 may be provided to a threat detection model creation computer 1260 that uses this data to create a decision boundary (that is, a boundary that separates normal behavior from abnormal behavior) in accordance with any of the embodiments described herein. The decision boundary may then be used by a threat detection computer 1250 executing a threat detection model 1255. The threat detection model 1255 may, for example, monitor streams of data from the monitoring nodes 1210 comprising data from sensor nodes, actuator nodes, and/or any other critical monitoring nodes (e.g., monitoring nodes $MN_1$ through $MN_N$) and automatically implement a self-healing adaptive control when appropriate.

Figure 13:
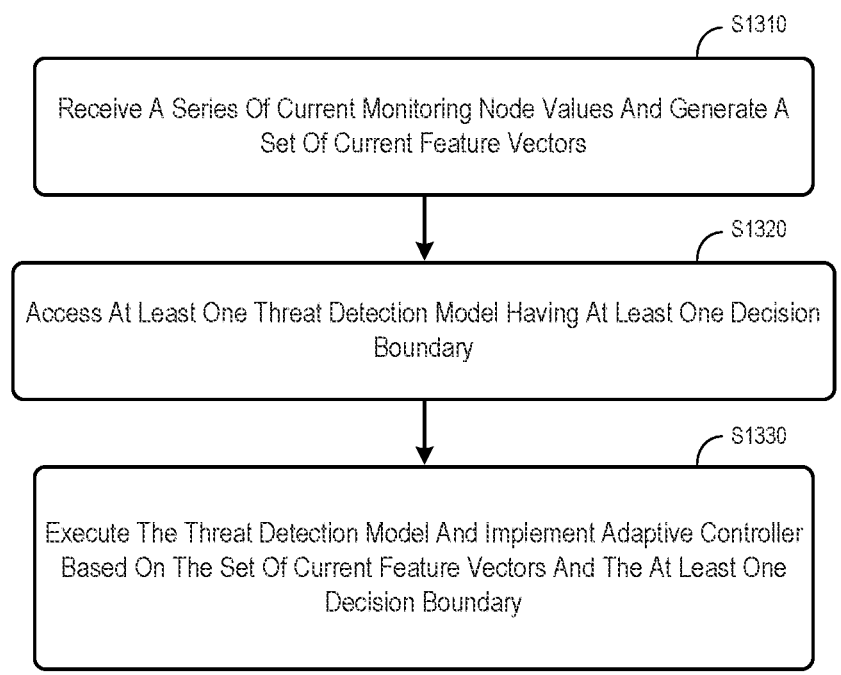
FIG. 13 is an industrial asset protection method for some use cases.

The decision boundary associated with the threat detection model can be used to detect cyber-attacks or other abnormal conditions. For example, FIG. 13 is an industrial asset protection method that might be implemented in some use cases. At S1310, the system may receive, from a plurality of monitoring nodes, a series of current values over time that represent a current operation of an industrial asset. The system may also generate, based on the received series of current values, a set of current feature vectors. At S1320, a threat detection model may be accessed including at least one decision boundary At S1330, the model may be executed, and the system may automatically implement a self-healing adaptive control when appropriate (e.g., when a cyber-attack is detected).

When available, a system may take advantage of the physics of an industrial asset by learning a priori from tuned high fidelity equipment models and/or actual "on the job" data to detect single or multiple simultaneous adversarial threats to the system. Moreover, monitoring node data may be converted to features using advanced feature-based methods, and the real-time operation of the control system may be monitoring in substantially real-time. Abnormalities may be detected by classifying the monitored data as being "normal" or "abnormal" (e.g., "attacked"). This decision boundary may be constructed in feature space using dynamic models and may help enable early detection of vulnerabilities (and potentially avert catastrophic failures) allowing the system to restore operation in a timely fashion. Note, however, that in many cases a physics-based model of an industrial asset might not be readily available. In such cases, synthetic attack monitoring node values can be used to improve the operation of the system.

Thus, embodiments may provide a system for the construction and use of one or more decision boundaries for abnormal operation detection in industrial control systems using historical data collected from the asset. Note that embodiments do not rely on the availability of any model of the asset and (thus it may be applicable to any new asset from any manufacturer as long as access to time series data is available). Embodiments may use collected field data for normal operation to reconstruct synthetic data points in the abnormal operating space using feature engineering. Having abnormal operating space may help provide a robust decision boundary (which can be difficult to obtain when access to high fidelity models is not available). According to some embodiments, attacks may be synthesized and injected into sensor, actuator, and/or controller monitoring nodes of data-driven identified plant and controller models. If additional normal data points are needed during boundary computation, embodiments may also synthesize them using the identified models.

Moreover, embodiments may provide an automated self-healing control design to handle cyberattacks on the controls. Such an approach may allow for the smooth and quick restoration of normal operation in the event of an abnormality, such as an attack or fault. As a result, the industrial asset may achieve increased reliability and resilience to cyber incidents while reducing the risk of physical damage to the system.

Figure 14:
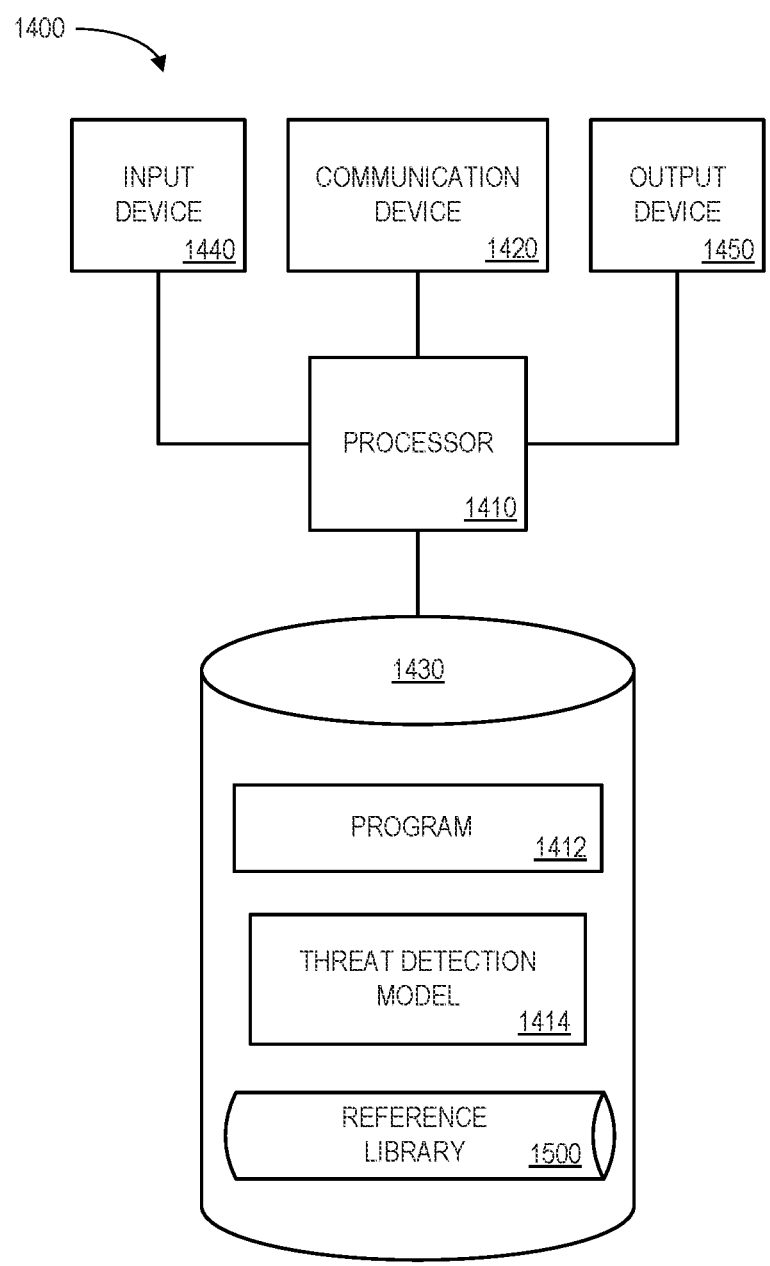
FIG. 14 is a block diagram of an industrial asset protection platform according to some embodiments.

The embodiments described herein may be implemented using any number of different hardware configurations. For example, FIG. 14 is a block diagram of an industrial asset protection platform 1400 that may be, for example, associated with the systems 100, 900, 1000 of FIGS. 1, 9, and 10 respectively. The industrial asset protection platform 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote monitoring nodes, user platforms, operator or administrator devices, etc. The industrial asset protection platform 1400 further includes an input device 1440 (e.g., a computer mouse and/or keyboard to input attack thresholds) and/an output device 1450 (e.g., a computer monitor to render a display, provide alerts, transmit recommendations, and/or create reports). According to some embodiments, a mobile device, monitoring physical system, and/or PC may be used to exchange information with the industrial asset protection platform 1400.

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a threat detection model 1414 for controlling the processor 1410. The processor 1410 performs instructions of the programs 1412, 1414, and thereby operates in accordance with any of the embodiments described herein. For example, the processor 1410 may access training data from normal operation of an industrial asset and the simulated abnormal data in the training data store. Based on the training data from normal operation of the industrial asset, simulated abnormal data, an abnormal operating condition, and a constrained optimization solution, the processor 1410 may create controller tuning parameters for at least one tuned data-driven adaptive controller such that an operating condition of the industrial asset will move from the abnormal operating condition to a normal operation condition through a stable trajectory. The processor 1410 may also receive a stream of current monitoring node values and, when the abnormal operating condition is detected, utilize controller tuning parameters to implement the at least one tuned data-driven adaptive controller.

The programs 1416, 1414 may be stored in a compressed, uncompiled and/or encrypted format. The programs 1416, 1414 may furthermore include other program elements, such as an operating system, clipboard application, a database management system, and/or device drivers used by the processor 1410 to interface with peripheral devices.

As used herein, information may be "received" by or "transmitted" to, for example: (i) the industrial asset protection platform 1400 from another device; or (ii) a software application or module within the industrial asset protection platform 1400 from another software application, module, or any other source.

In some embodiments (such as the one shown in FIG. 14), the storage device 1430 further stores a reference library 1500. An example of a database that may be used in connection with the industrial asset protection platform 1400 will now be described in detail with respect to FIG. 15. Note that the database described herein is only one example, and additional and/or different information may be stored therein. Moreover, various databases might be split or combined in accordance with any of the embodiments described herein.

Figure 15:
FIG. 15 is a tabular portion of a data-driven model database in accordance with some embodiments.

Referring to FIG. 15, a table is shown that represents the reference library 1500 that may be stored at the industrial asset protection platform 1400 according to some embodiments. The table may include, for example, entries identifying industrial assets to be protected. The table may also define fields 1502, 1504, 1506, 1508, 1510, 1512 for each of the entries. The fields 1502, 1504, 1506, 1508, 1510, 1512 may, according to some embodiments, specify: an industrial asset identifier 1502, an industrial asset description 1504, a model identifier 1506, an attack condition 1508, an attack type 1510, and tuning parameters 1512. The reference library 1500 may be created and updated, for example, when a new physical system is monitored or modeled, existing systems are upgraded, etc.

The industrial asset identifier 1502 and description 1504 may define a particular machine or system that will be protected. The model identifier 1506 might be a unique alphanumeric code identifying a particular data-driven, dynamic system model. The attack condition 1508 may indicate the type of abnormal condition being addressed (e.g., a zone in the abnormal operating space). The attack type 1510 may describe the type of cyber-attack associated with the attack condition 1508 (e.g., a bias attack, a sinusoidal attack, etc.). The tuning parameters 1512 may comprise a set of parameters $K_t$ that can be used to create a self-healing data-driven adaptive controller for the industrial asset identifier 1502 in accordance with any of the embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators or natural gas pipelines, any of the embodiments described herein could be applied to other types of assets, such as dams, power grid components, military devices, etc.

Figure 16:
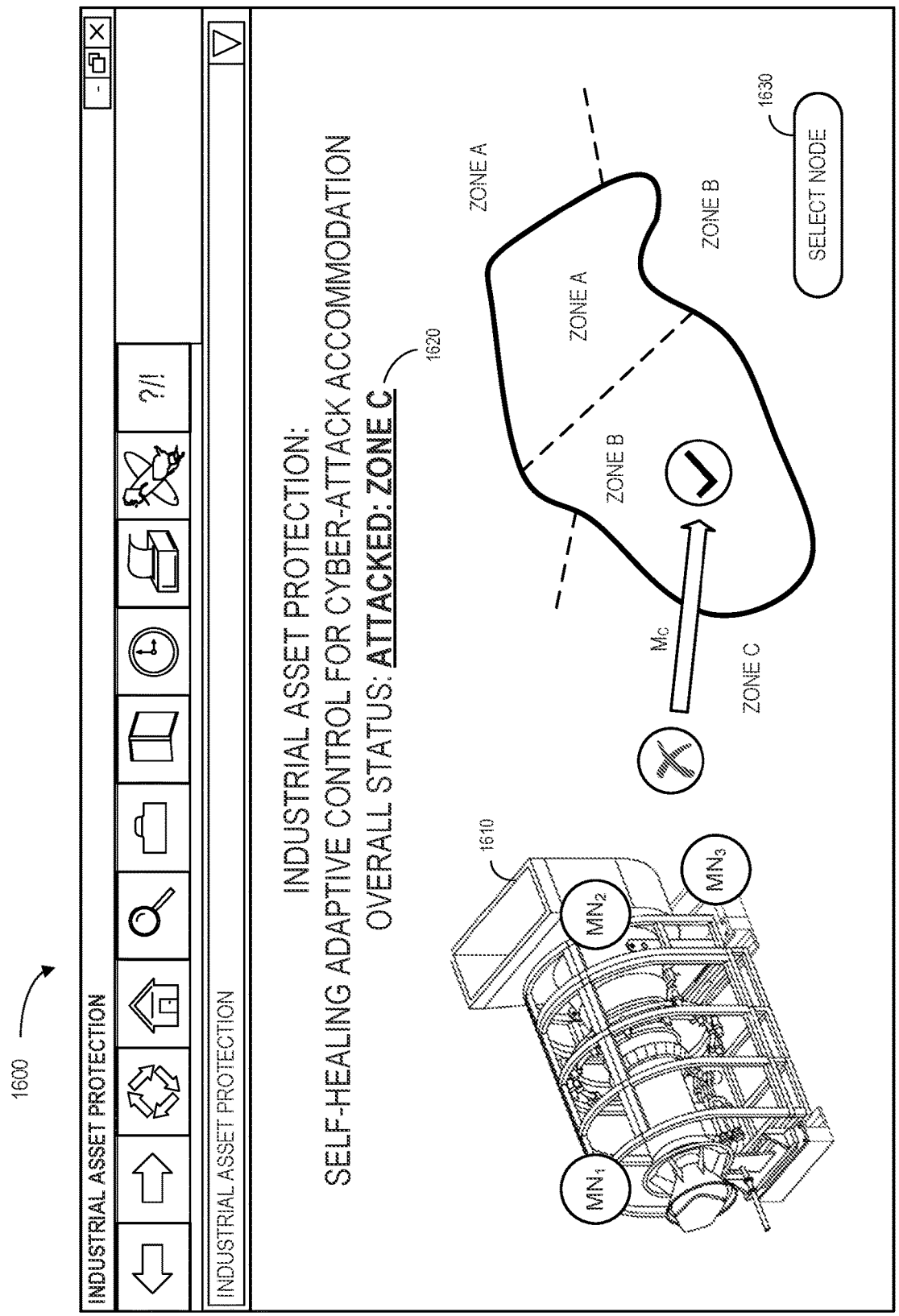
FIG. 16 is a display in accordance with some embodiments.

FIG. 16 is a threat detection system display 1600 in accordance with some embodiments. The display 1600 includes information about an industrial asset 1610 having a number of monitoring nodes ($MN_1$ through $MN_3$). In particular, the display 1600 might include an overall current system status 1620 as determined by any of the embodiments described herein. According to some embodiments, the display 1600 is interactive and may be used by an operator to determine more detailed information (e.g., via selection of an icon 1630), alter system mappings, adjust the operation of the system, etc.

Figure 17:
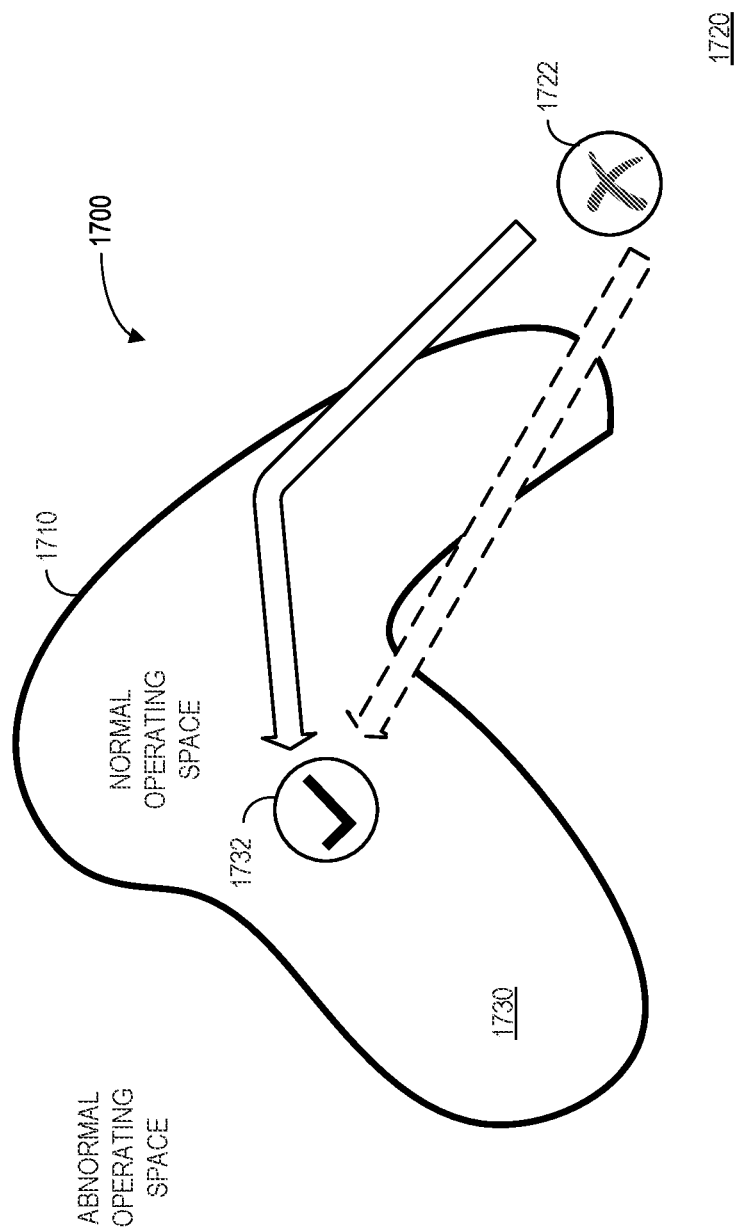
FIG. 17 illustrates multiple trajectories according to some embodiments.

According to some embodiments, tuning parameters are selected such that an operating condition of an industrial asset moves from an abnormal operating condition to a normal operating condition through a stable trajectory. For example, FIG. 17 illustrates multiple trajectories according to some embodiments. Operating condition spaces 1700 include a decision boundary 1710 that separates an abnormal operating space 1720 from a normal operating space 1730. Embodiments may use a self-healing adaptive controller to move the system from a current abnormal operating condition 1722 ("X") to an achievable normal operating condition 1732 (checkmark) through a first trajectory as shown by a dashed arrow in FIG. 17. Note, however, that the first trajectory moves the system from the abnormal operating space 1720 into the normal operating space 1730 and then back into the abnormal operating space 1720 before reaching the achievable normal operating condition 1732. To avoid such a result, the system may instead select a model that moves through a second entry as shown by the solid arrow in FIG. 17. In this case, the current abnormal operating condition 1722 is moved to the achievable normal operating condition 1732 without such a back-and-forth transition. Other considerations associated with a stable trajectory may include signal overshoots, situations from which the system is unable to return, etc. Although a simple two-dimensional decision boundary 1710 is illustrated in FIG. 17 for clarity, note that more complex boundaries may be implemented.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to protect an industrial asset, comprising:
   a training data store containing training data associated with monitoring node values during normal operation of the industrial asset and simulated abnormal data;
   an offline model tuning platform, coupled to the training data store, to:
   access the training data from normal operation of the industrial asset and the simulated abnormal data in the training data store, and
   based on the training data from normal operation of the industrial asset, the simulated abnormal data, an abnormal operating condition, and a constrained optimization solution, create controller tuning parameters for at least one tuned data-driven adaptive controller such that an operating condition of the industrial asset will move from the abnormal operating condition to a normal operation condition through a stable trajectory;

a controller reference library to store the tuning parameters created by the offline model tuning platform; and an online monitoring platform, coupled to the controller reference library, to receive a stream of current monitoring node values and, when the abnormal operating condition is detected, utilize the controller tuning parameters to implement the at least one tuned data-driven adaptive controller.

2. The system of claim 1, wherein the tuned data-driven adaptive controller comprises a closed loop system that resembles a desired stable reference model.

3. The system of claim 1, wherein the simulated abnormal data is associated with at least one of a physics-based model and a data-driven model.

4. The system of claim 1, wherein the simulated abnormal data is associated with a Generative Adversarial Network ("GAN").

5. The system of claim 1, wherein the operating condition is associated with a normal space and an abnormal space separated by a decision boundary.

6. The system of claim 5, wherein the abnormal space is divided into a plurality of abnormal zones each associated with a different stable closed loop model reference.

7. The system of claim 5, wherein the normal space is divided into a plurality of normal zones each associated with a different achievable normal operating condition.

8. The system of claim 1, wherein the constrained optimization solution is represented by an optimization problem given by:

$$\rho_s = \mathrm{argmin}_\rho J(\rho), \text{ s.t. } \delta(\rho) \leq \delta_N$$

$$J(\rho) = |(1-M)(M-K(\rho)(1-M)G|_2$$

$$\delta(\rho) = |M_S - K(\rho)(1-M_S)G|_2$$

where G represents an open loop plant, M represents a model reference, K represents stabilizing for a controller of the plant G, K($\rho$) is the controller with control parameter $\rho$, and $M_S$ is the closed loop plant stabilized by controller $K_S$.

9. The system of claim 1, wherein the online monitoring platform decides between a resilient estimation accommodation and the tuned data-driven adaptive controller accommodation.

10. The system of claim 1, wherein the received stream of current monitoring node values is associated with a Supervisory Control And Data Acquisition ("SCADA") data stream.

11. The system of claim 1, wherein the monitoring nodes include at least one of: (i) a sensor node, (ii) a critical sensor node, (iii) an actuator node, (iv) a controller node, and (v) a key software node.

12. The system of claim 1, wherein the abnormal operating condition is associated with at least one of a cyber-attack and a fault.

13. The system of claim 1, wherein the industrial asset is associated with at least one of: (i) a turbine, (ii) a gas turbine, (iii) a wind turbine, (iv) an engine, (v) a jet engine, (vi) a locomotive engine, (vii) a refinery, (viii) a power grid, and (ix) an autonomous vehicle.

14. A computerized method to protect an industrial asset, comprising:

accessing, by a computer processor of an offline model tuning platform, training data from normal operation of the industrial asset and simulated abnormal data from a training data store;

based on the training data from normal operation of the industrial asset, the simulated abnormal data, an abnormal operating condition, and a constrained optimization solution, creating controller tuning parameters for at least one tuned data-driven adaptive controller such that an operating condition of the industrial asset will move from the abnormal operating condition to a normal operation condition through a stable trajectory; and receiving, by an online monitoring platform, a stream of current monitoring node values and, when the abnormal operating condition is detected, utilizing the controller tuning parameters from a controller reference library to implement the at least one tuned data-driven adaptive controller.

15. The method of claim 14, wherein the tuned data-driven adaptive controller comprises a closed loop system that resembles a desired stable reference model.

16. The method of claim 14, wherein the operating condition is associated with a normal space and an abnormal space separated by a decision boundary.

17. The method of claim 16, wherein the abnormal space is divided into a plurality of abnormal zones each associated with a different stable closed loop model reference.

18. The method of claim 16, wherein the normal space is divided into a plurality of normal zones each associated with a different achievable normal operating condition.

19. A non-transitory, computer-readable medium storing instructions that, when executed by a computer processor, cause the computer processor to perform a method to protect an industrial asset, the method comprising:

accessing, by a computer processor of an offline model tuning platform, training data from normal operation of the industrial asset and simulated abnormal data from a training data store;

based on the training data from normal operation of the industrial asset, the simulated abnormal data, an abnormal operating condition, and a constrained optimization solution, creating controller tuning parameters for at least one tuned data-driven adaptive controller such that an operating condition of the industrial asset will move from the abnormal operating condition to a normal operation condition through a stable trajectory; and receiving, by an online monitoring platform, a stream of current monitoring node values and, when the abnormal operating condition is detected, utilizing the controller tuning parameters from a controller reference library to implement the at least one tuned data-driven adaptive controller.

20. The medium of claim 19, wherein the constrained optimization solution is represented by an optimization problem given by:

$$\rho_s = \mathrm{argmin}_\rho J(\rho), \text{ s.t. } \delta(\rho) \leq \delta_N$$

$$J(\rho) = |(1-M)(M-K(\rho)(1-M)G|_2$$

$$\delta(\rho) = |M_S - K(\rho)(1-M_S)G|_2$$

where G represents an open loop plant, M represents a model reference, K represents stabilizing for a controller of the plant G, K(ρ) is the controller with control parameter ρ, and $M_S$ is the closed loop plant stabilized by controller $K_S$.

* * * * *